(12) United States Patent
Kondo

(10) Patent No.: US 8,485,670 B2
(45) Date of Patent: Jul. 16, 2013

(54) PROJECTOR APPARATUS

(75) Inventor: Yuji Kondo, Kanagawa (JP)

(73) Assignee: Sony Corporation (JP)

( * ) Notice: Subject to any disclaimer, the term of this patent is extended or adjusted under 35 U.S.C. 154(b) by 374 days.

(21) Appl. No.: 12/930,604

(22) Filed: Jan. 11, 2011

(65) Prior Publication Data

US 2011/0176117 A1    Jul. 21, 2011

(30) Foreign Application Priority Data

Jan. 19, 2010    (JP) .............................. P2010-009303

(51) Int. Cl.
*G03B 21/18*    (2006.01)

(52) U.S. Cl.
USPC .......................................................... 353/61

(58) Field of Classification Search
USPC ........... 353/52, 55, 57–61; 362/294; 352/148; 359/512
See application file for complete search history.

(56) References Cited

U.S. PATENT DOCUMENTS 6,533,835 B2 *   3/2003   Wilson et al. .................... 55/481
2009/0190100 A1   7/2009   Tanaka et al.

FOREIGN PATENT DOCUMENTS

JP   2004-157347 A   6/2004
JP   2009-175404 A   8/2009

* cited by examiner

*Primary Examiner* — Georgia Y Epps
*Assistant Examiner* — Danell L Owens
(74) *Attorney, Agent, or Firm* — Lerner, David, Littenberg, Krumholz & Mentlik, LLP

(57) ABSTRACT

A projector apparatus for projecting an image to a projected surface by illuminating an image forming element using light from a light source is provided. The projector apparatus includes an apparatus casing containing the light source and the image forming element, and an air filter receiving portion provided in the apparatus casing and having an air intake through which air is drawn. The projector apparatus also includes a plurality of air filters having substantially the same size as an air intake opening area, a cooling fan causing air to flow into the projector apparatus through the air intake and causing the air to pass through the plurality of air filters, a first air channel directing a portion of the air to a front air filter, and a second air channel directing the remaining portion of the air to a rear air filter.

6 Claims, 6 Drawing Sheets

PROJECTOR APPARATUS

CROSS-REFERENCE TO RELATED APPLICATION

The present application claims priority from Japanese Patent Application No. JP 2010-009303 filed in the Japanese Patent Office on Jan. 19, 2010, the entire content of which is incorporated herein by reference.

BACKGROUND OF THE INVENTION

1. Field of the Invention

The present invention relates to a projector apparatus that optically enlarges an image in a small display device formed by a liquid crystal panel, a cathode-ray tube, or the like to display the image in a large screen by projecting the image to a projected surface (screen). In particular, the present invention relates to a projector apparatus that is air-cooled inside.

2. Description of the Related Art

Japanese Unexamined Patent Application Publication No. 2009-175404 discloses a technology as a first example of a related art projector. Japanese Unexamined Patent Application Publication No. 2009-175404 discloses a technique relating to an image projecting apparatus that illuminates image forming elements used to form an original picture using light emitted from a light source, and projects the light from the image forming elements to the projected surface. The image projecting apparatus includes a casing having an air intake that is provided with a dust-removing filter, a fan that draws air into the casing through the air intake, a duct that directs the air drawn through the air intake to a space containing the image forming elements, and an air channel chamber provided between the duct and the air intake. In addition, in the image projecting apparatus, the cross-sectional area of the air channel chamber at a connecting portion between the air channel chamber and the duct and perpendicular to an air flow direction into the duct is larger than that of the connecting portion.

Japanese Unexamined Patent Application Publication No. 2004-157347 also discloses a technology as a second example of a related art projector. Japanese Unexamined Patent Application Publication No. 2004-157347 discloses a technique relating to a projector. This projector includes a first filter provided in an air intake formed in an outer casing, the first filter being used to remove dust and the like from air drawn by a fan. In this projector, a filter unit that includes a second filter having an area larger than that of the first filter is removably mounted in the outer casing so as to cover the air intake from an outer side of the first filter.

However, the related art projector apparatuses are structured such that the air filter is disposed immediately inside the air intake and the air drawing fan is disposed inside the air filter. Since the air drawn through the air intake is directly drawn by the air drawing fan through the air filter and fed to an inner portion of the projector apparatus in this structure, an area of the air filter that can be allocated in this structure is only substantially equal to an area of the air intake. As a result, it is difficult to expand the area of air intake due to a size limitation of the apparatus casing. Expanding the area of the air filter typically results in an increase in the size of the apparatus casing. This poses a problem in that the size of the whole apparatus is increased.

In this regard, the first related art example disclosed in Japanese Unexamined Patent Application Publication No. 2009-175404 includes an optical system cooling fan, a lamp cooling fan, and a power unit cooling fan in order to air-cool an inner portion of an apparatus casing. The optical system cooling fan is used to cool optical elements such as liquid crystal panels, polarizing plates, and so forth and is connected to an air intake provided in an apparatus cabinet through a duct. The lamp cooling fan is used to cool a light source lamp and is connected to an air intake through a duct. The power unit cooling fan is used to cool a PFC power unit and a ballast power unit and is connected to an air intake through a duct as is the case with other cooling fans. The dust removing filter is provided in the air intake, which is used to remove dust from drawn air. By doing this, the dust-filtered air is separately supplied to each cooling fan through the ducts. Due to this structure, expanding the area of the air filter typically results in an increase in the size of the apparatus casing. This poses a problem in that the size of the whole apparatus is increased.

The second related art example disclosed in Japanese Unexamined Patent Application Publication No. 2004-157347 has a structure such that the second filter having an area larger than that of the first filter is arranged so as to cover the air intake from the outer side of the first filter. Due to this structure, expanding the area of the air filter typically results in an increase in the size of the apparatus casing. This poses a problem in that the size of the whole apparatus is increased as is the case with the first related art example.

SUMMARY OF THE INVENTION

The problem to be solved is as follows. The related art projectors are structured such that the air filter is disposed immediately inside an air intake and an air drawing fan is disposed inside the air filter. The air drawn through the air intake is directly drawn by the air drawing fan through the air filter and fed to an inner portion of the projector apparatus. Due to this structure, the area of the air filter that can be allocated is only substantially equal to an area of the air intake. Expanding the area of the air filter typically results in an increase in the size of the apparatus casing. This poses a problem in that the size of the whole apparatus is increased.

According to an embodiment of the present invention, there is provided a projector apparatus that projects an image to a projected surface by illuminating an image forming element using light from a light source. The projector apparatus includes an apparatus casing that contains the light source and the image forming element, an air filter receiving portion that is provided in the apparatus casing and includes an air intake through which air is drawn, a plurality of air filters, a cooling fan, a first air channel, and a second air channel. The plurality of air filters have substantially the same area as an opening area of the air intake and are disposed opposite each other so as to face each other in the air filter receiving portion. The cooling fan causes air to flow into the projector apparatus through the air intake by drawing air therearound and causes the air to pass through the plurality of air filters before blowing the air onto the light source and the image forming element to dissipate heat therefrom. The first air channel directs a portion of the air flowing into the projector apparatus through the air intake to a front air filter that is positioned close to the air intake among the plurality of air filters and directs the air to the cooling fan by causing the air to pass through the front air filter. The second air channel directs the remaining portion of the air to a rear air filter that is positioned away from the air intake and directs the air to the cooling fan by causing the air to pass through the rear air filter.

In a projector apparatus according to an embodiment of the present invention, the total filtering area can be increased without increasing the number and area of air intakes for drawing air used to cool an inner portion of the projector apparatus. Therefore, the projector apparatus can supply a great amount of dust-filtered air to a cooling fan using the air filters having expanded areas while the whole size of the projector apparatus is not increased but maintained in a small size. As a result, efficiency in dissipating heat from the light source and so forth can be improved.

DESCRIPTION OF THE PREFERRED EMBODIMENTS

A plurality of air filters having substantially the same area as an opening area of an air intake are disposed opposite each other so as to face each other on the inner side of the air intake, and an air flow from the air intake is divided into a first air channel and a second air channel to pass through the plurality of air filters. This increases the total filtering area and accordingly expands an area set to remove dust without increasing the number and area of air intakes. Thus, a projector apparatus capable of supplying a great amount of dust-filtered air from a cooling fan to a light source and so forth is achieved using a comparatively simple structure.

Embodiment

Figure 1:
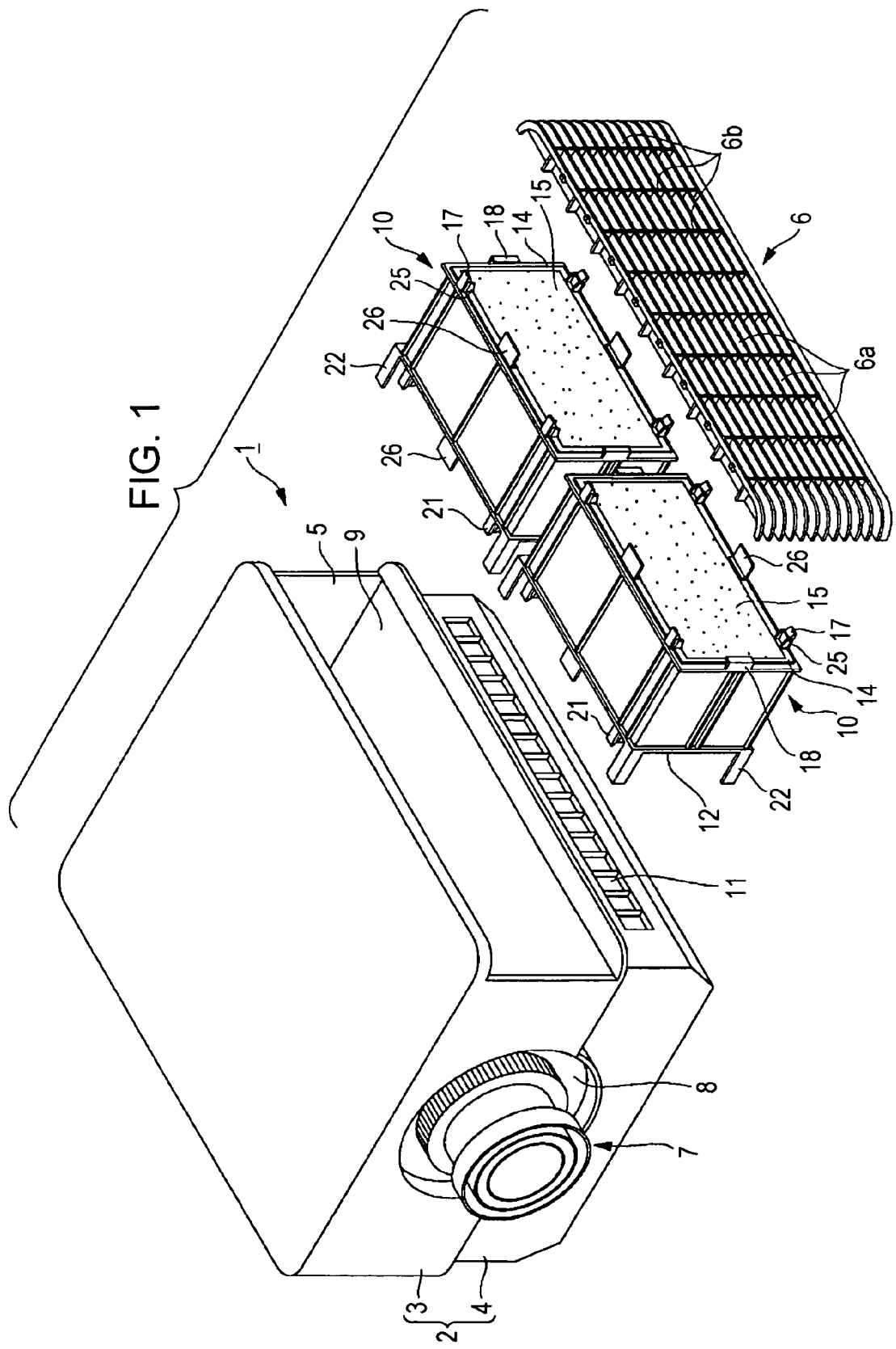
FIG. 1 is an exploded perspective view illustrating a projector apparatus according to an embodiment of the present invention.
Figure 2:
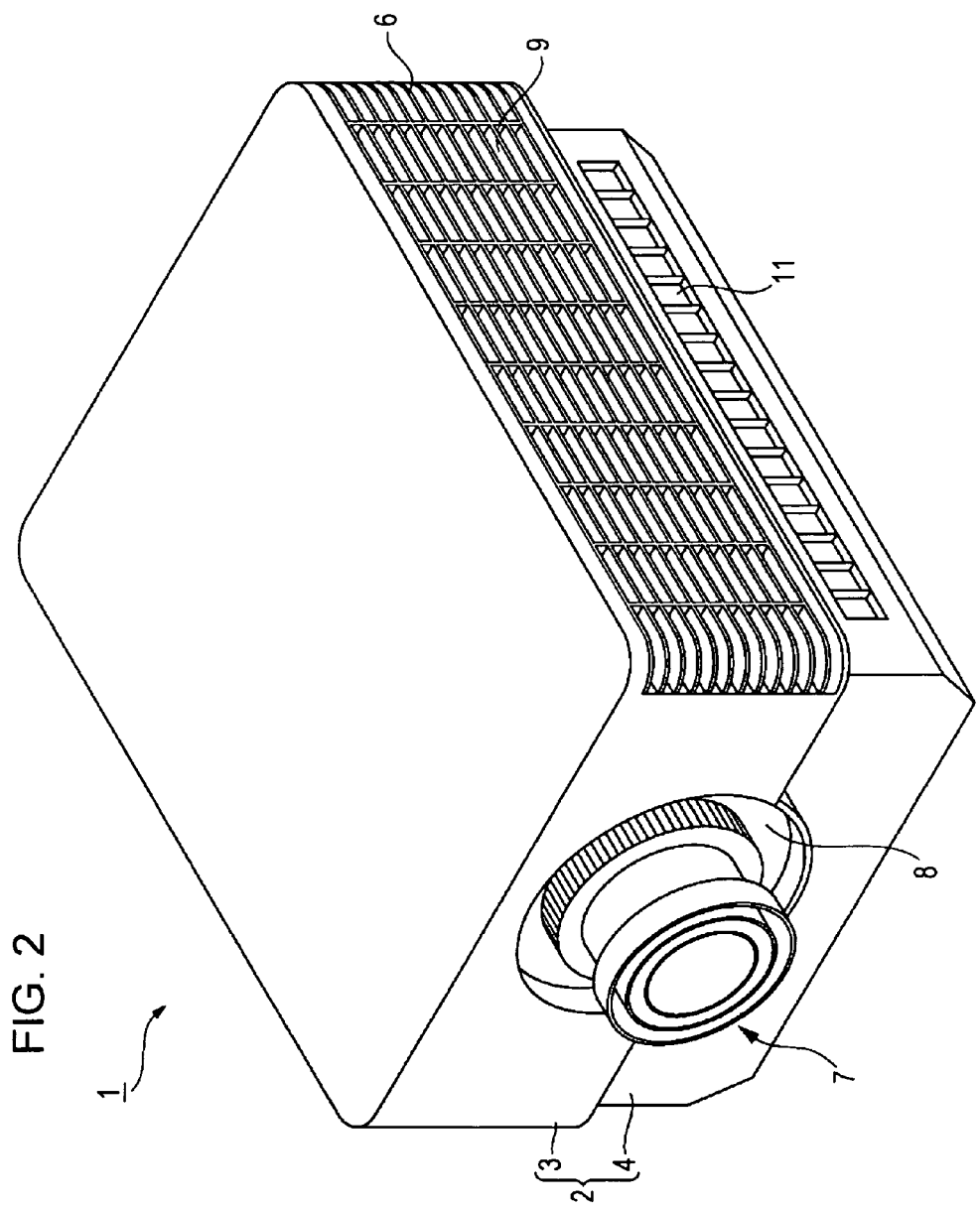
FIG. 2 is a perspective view illustrating the projector apparatus according to the embodiment of the present invention.

FIGS. 1 and 2 illustrate a projector apparatus 1 (image projecting apparatus) according to an embodiment of the present invention. The projector apparatus 1 includes an apparatus casing 2 that constitutes an outer casing.

The apparatus casing 2 includes an upper casing 3 and a lower casing 4, which are arranged one on top of the other, and a grid-like cover 6 removably fitted on an air intake 9 that serves as an opening of an air filter receiving portion 5 provided in the upper casing 3. The upper casing 3 and the lower casing 4 are arranged one on top of the other and secured to each other by fixing screws (not shown). Components such as a light source unit, an optical unit, a power unit, which are not shown, and a projector lens unit 7 are contained in a space formed between both of the casings.

A through hole 8 is formed in a front surface portion of the upper casing 3. One end of the projector lens unit 7, the projector lens unit 7 being disposed through the through hole 8, protrudes forward from the front surface portion. The projector lens unit 7 enlarges light (image) from a light source of the light source unit (not shown) and projects the light to a screen (projected surface), which is not shown. The light source unit includes a light source lamp, for example, a high pressure mercury discharge lamp, a halogen lamp, or the like.

The optical unit includes, for example, a polarization conversion element that converts light from the light source lamp into a kind of light having a bundle of rays that are aligned in parallel with each other, three liquid crystal panels as image forming elements that divide the polarized light into red (R), green (G), and blue (B) components and modulate the resulting light, a prism combiner that combines the modulated color light components, and so forth. The power unit supplies power to the light source unit, the optical unit, and so forth, the power unit being used to control lighting of the light source lamp and drive the liquid crystal panels. The power source unit also supplies power to other devices and units to control their operations.

The air filter receiving portion 5 having a size (area) in which two air filter units 10 can be removably mounted is provided in a left side portion of the upper casing 3. The grid-like cover 6 is removably fitted on the air intake 9 of the air filter receiving portion 5. The grid-like cover 6 is provided in order to prevent comparatively large foreign matter from entering into the air filter receiving portion 5 and includes a plurality of horizontal bars 6a that extend in a horizontal direction and vertical bars 6b that extend in a vertical direction. In addition, opening windows are provided in the left side portion of the lower casing 4.

Figure 3:
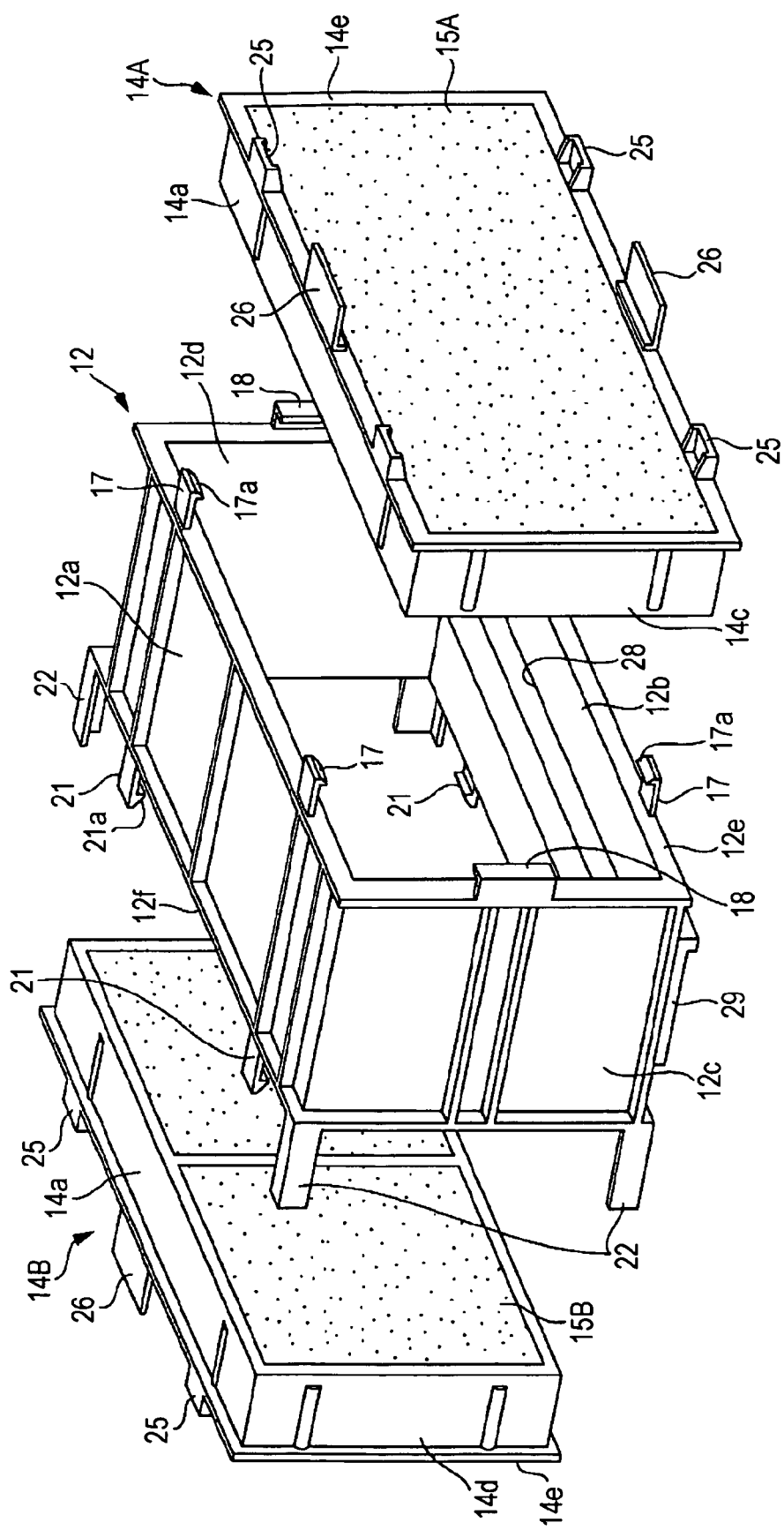
FIG. 3 is an exploded view illustrating an example of an air filter unit suitable for use in the projector apparatus according to the embodiment of the present invention.
Figure 4:
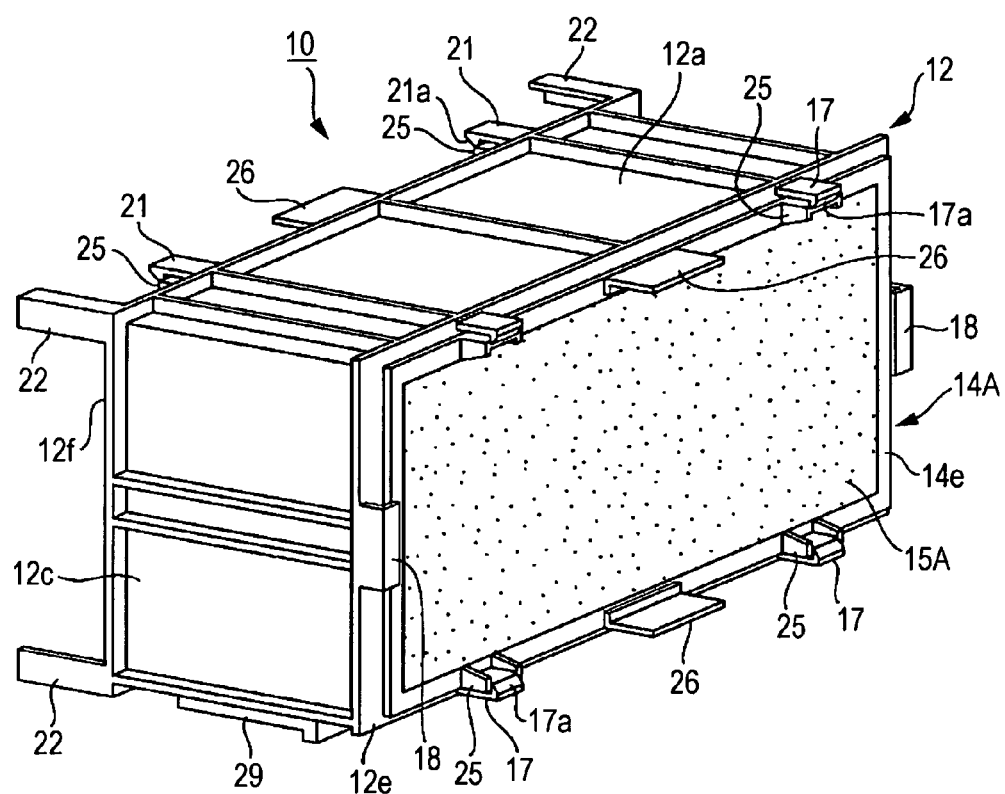
FIG. 4 is a perspective view illustrating an example of the air filter unit suitable for use in the projector apparatus according to the embodiment of the present invention.
Figure 5:
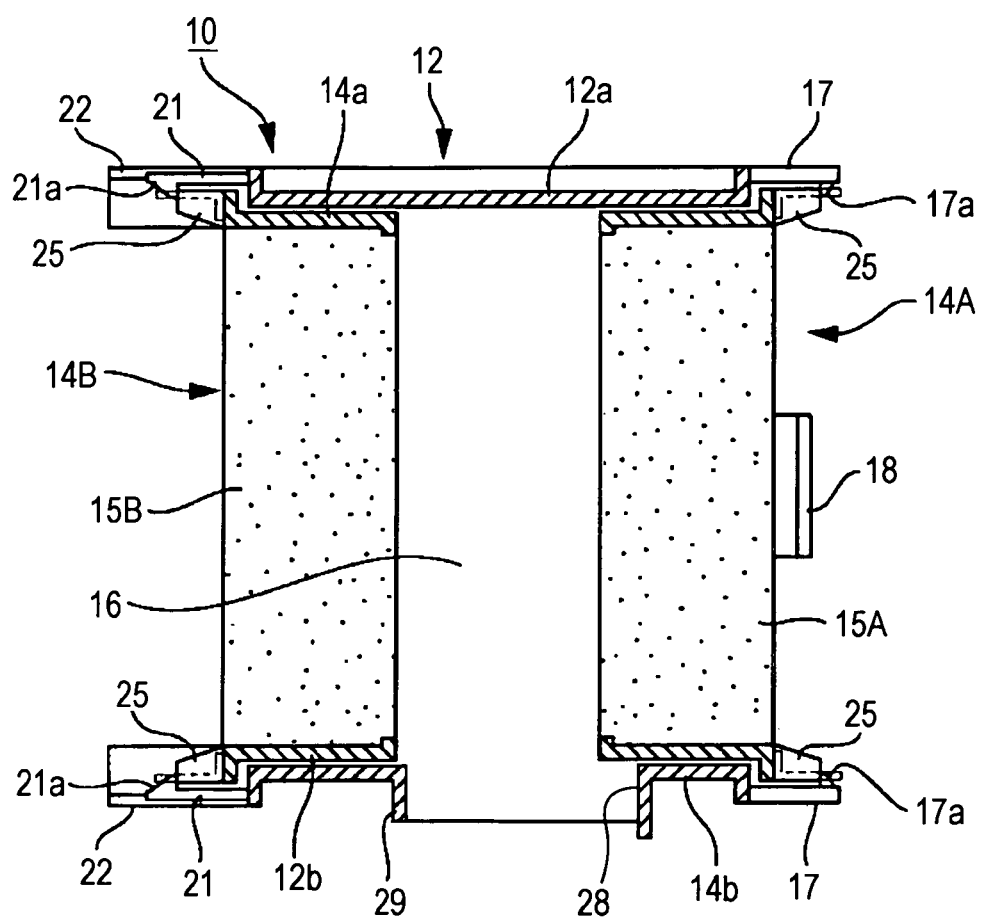
FIG. 5 is an explanatory view of a center portion of the air filter unit illustrated in FIG. 4 which has been vertically sectioned.

Each air filter unit 10 is structured as illustrated in FIGS. 3 to 5. That is, the air filter unit 10 includes a holder case 12, two filter holders 14A and 14B, and two air filters, front and rear air filters 15A and 15B. The two filter holders 14A and 14B are removably mounted in both sides of the holder case 12. In addition, the two air filters, the front and rear air filters 15A and 15B, are respectively mounted in the two filter holders 14A and 14B.

As described in FIG. 3 and so forth, the holder case is composed of a formwork-like member shaped to be a rectangular parallelepiped that is formed by the following four sides, that is, an upper surface portion 12a, a lower surface portion 12b, and left and right side surface portions 12c and 12d in a surrounding manner. Therefore, the holder case 12 includes a space portion 16 formed to be a rectangular parallelepiped that extends through the holder case 12 from a front portion to a rear portion. A front flange portion 12e having a quadrangle frame-like shape is formed in the front side of the holder case 12, the front flange portion 12e extending outward so as to surround a periphery of the space portion 16. In addition, a rear flange portion 12f having a quadrangle frame-like shape is formed in the rear side of the holder case 12, the rear flange portion 12f extending outward so as to surround another periphery of the space portion 16.

Two locking pieces 17 having an elastic property are provided in each of two perpendicularly opposing edges of the front flange portion 12e of the holder case 12 such that the locking pieces 17 protrude forward. The four upper and lower locking pieces 17 are disposed in a perpendicularly and laterally symmetric manner. Each locking piece 17 includes a nail portion 17a that protrudes inward at an end of the locking piece 17. In addition, the holder case 12 also includes catches 18 having L-shaped sectional shapes in two opposing edges in a lateral direction of the front flange portion 12e (longitudinal direction of the holder case 12), the catches 18 being used to hold the holder case 12.

Two locking pieces 21 having an elastic property are provided in each of two perpendicularly opposing edges of the rear flange portion 12f of the holder case 12 such that the locking pieces 21 protrude rearward. The four upper and lower locking pieces 21 are disposed in a perpendicularly and laterally symmetric manner. Each locking piece 21 includes a nail portion 21a that protrudes inward at an end of the locking piece 21. In addition, the holder case 12 includes an air channel protrusion portion 22 in each of four corners of the rear flange portion 12f, the air channel protrusion portion 22 protruding rearward further than the locking pieces do. The four air channel protrusion portions 22 also function in positioning the air filter unit 10 to be inserted into the air filter receiving portion 5.

A partition wall 19 that provides a partition in a rear side of the air filter receiving portion 5 is provided inside the apparatus casing 2. By inserting the air filter unit 10 until the air channel protrusion portions 22 come into contact with this partition wall 19, the air filter unit 10 is positioned in place inside the air filter receiving portion 5. At the same time, a second air channel that directs the air to a front surface of the rear air filter 15B disposed in a rear side of the air filter unit 10 is formed in an area surrounded by the four air channel protrusion portions 22.

The two filter holders 14A and 14B are identically structured, each composed of a formwork-like member shaped in a rectangular parallelepiped that is formed by the following four sides, that is, an upper surface portion 14a, a lower surface portion 14b, and left and right side surface portions 14c and 14d in a surrounding manner. Therefore, each of the filter holders 14A and 14B includes a space formed as a rectangular parallelepiped penetrating through the each of the filter holders 14A and 14B from a front portion to a rear portion. The two filter holders 14A and 14B are removably mounted in the space portion 16 of the holder case 12 from the front and rear side of the holder case 12, respectively.

In addition, a flange portion 14e having a quadrangle frame-like shape is provided in a front side of each of the filter holders 14A and 14B, the flange portion 14e extending inward and outward so as to form an edge of the space. Two nail hooks 25 that protrude forward are provided in each of two perpendicularly opposing edges of the flange portion 14e. The four upper and lower nail hooks 25 are disposed in a perpendicularly and laterally symmetric manner and at positions corresponding to the four locking pieces 17. When assembled, each of the four nail hooks 25 is positioned inside the corresponding locking piece 17. The nail portions 17a are disengageably engaged with the ends of the corresponding nail hooks 25.

In addition, each of the filter holders 14A and 14B includes catches 26, which are adapted to hold the filter holder 14A or 14B and have L-shaped sectional shapes, in two perpendicularly (direction perpendicular to the longitudinal direction) opposing edges of the flange portion 14e of the filter holders 14A and 14B.

The front and rear air filters 15A and 15B are mounted in the space of the filter holders 14A and 14B having such a structure. The front and rear air filters 15A and 15B are formed of, for example, urethane rubber or a non-woven fabric that can collect dust, and the like. However, this does not limit the material of the front and rear air filters 15A and 15B. It will be understood by one skilled in the art that various other materials such as an electrostatic filter material may be used as the material of the front and rear air filters 15A and 15B.

A communicating opening 28 serving as an air supplying side of the cooling fan is provided in the lower surface portion 12b of the holder case 12. The communicating opening 28 is formed as a broad elongate hole continuously extending from the one side surface portion 12c to the other side surface portion 12d in the lower surface portion 12b. A frame 29 that projects downward is provided around the communicating opening 28.

As a material for the upper casing 3, the lower casing 4, the grid-like cover 6, the holder case 12 and the filter holders 14A and 14B, for example, acrylonitrile butadiene styrene (ABS) resin is preferable. However, the material of the above components is not limited to ABS. For example, polyacetal (POM) or other engineering plastics may be used. Furthermore, a stainless steel plate, a steel plate, an aluminum alloy, and other metal materials may be used.

The air filter unit 10 having the above-described structure is removably mounted in the air filter receiving portion 5. A cooling fan 30 for cooling the light source lamp, optical unit, and so forth is disposed in a portion that faces the air filter receiving portion 5. A sirocco fan, which rotates a blade wheel having a number of blades to draw air from its rotational center side and to discharge the air from an outer side of the blades in a tangential direction, is used as the cooling fan 30. This cooling fan 30 (sirocco fan) is disposed in a lower surface portion of the air filter receiving portion 5 with an air intake 31 directed upward.

Figure 6:
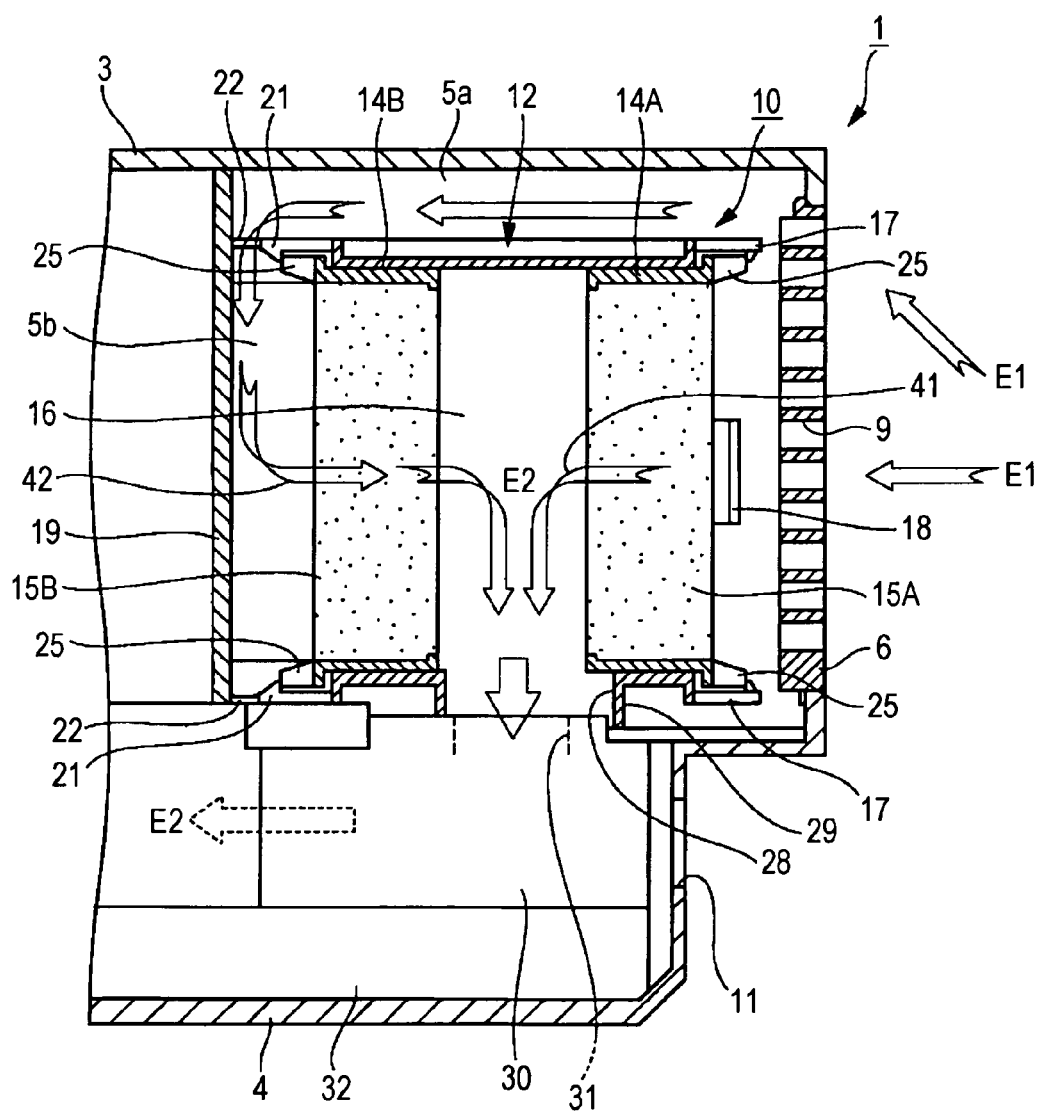
FIG. 6 is an explanatory view of part of the projector apparatus illustrated in FIG. 1 which has been sectioned in order to explain airflow and so forth.

As illustrated in FIG. 6, the cooling fan 30 is fixed to a base member 32 with the air intake 31 directed upward, and the base member 32 is received in the concave portion of the lower casing 4 to be fixed. When the air filter unit 10 is mounted in place in the air filter receiving portion 5, the communicating opening 28 faces the air intake 31 of the cooling fan 30. The air drawn from the air intake 31 is discharged from the discharge opening of the cooling fan 30. By doing this, a great amount of dust-filtered air having passed through the two air filters, the front and rear air filters 15A and 15B respectively disposed in the front and rear positions so as to oppose each other, is drawn by the cooling fan 30 and blown onto the light source lamp, optical unit, and so forth.

Out of the air passing through the air filter unit 10, a portion of the air flows toward the front air filter 15A disposed close to the air intake 9, passes through the front air filter 15A from the front surface of the front air filter 15A, and then flows into the space portion 16 of the holder case 12. This portion of the air is then supplied to the air intake 31 of the cooling fan 30 through the communicating opening 28 provided in the lower surface portion 12b of the holder case 12. The air channel here defines a first air channel 41 that directs the air from outside toward the cooling fan 30.

In addition, out of the air passing through the air filter unit 10, another portion of the air flows toward the rear air filter 15B disposed away from the air intake 9. The air initially flows into an upper channel space 5a formed above the holder case 12. The air having flowed into the channel space 5a moves further to the rear side to flow into a rear channel space 5b formed inside the four air channel protrusion portions 22 disposed in the rear side of the holder case 12. The air faces the front side of the rear air filter 15B disposed away from the air intake 9, passes through the rear air filter 15B, and flows into the space portion 16 of the holder case 12. After this, the air is supplied to the air intake 31 of the cooling fan 30 through the communicating opening 28 provided in the lower surface portion 12b of the holder case 12. The air channel here defines a second air channel 42 that directs the air from outside toward the cooling fan 30.

Each air filter unit 10 having the above-described structure can be assembled, for example, in the following manner. The air filter 15A and the air filter 15B are respectively mounted in the two filter holders 14A and 14B in advance. Then, the front filter holder 14A is made to face one of the openings of the space portion 16 of the holder case and inserted into the space portion 16 from the side opposite the flange portion 14e. At this time, when the front filter holder 14A has been inserted to a certain point, inclined faces of the nail portions 17a of the four locking pieces 17 provided in the front flange portion 12e of the holder case 12 come into contact with the corresponding base portions of the nail hooks 25 provided in the flange portion 14e of the front filter holder 14A.

Each of the four locking pieces 17 has an elastic property of an adequate degree. Therefore, when the front filter holder 14A is pressed with an adequate force, each of the four locking pieces 17 is caused to elastically deform outward to allow each of the nail portions 17a to be pushed beyond the corresponding nail hook 25. Thus, the front filter holder 14A is mounted on one of the sides (for example, front side) of the holder case 12. Furthermore, since the nail portions 17a having been pushed beyond the nail hooks 25 are engaged with the end faces of the nail hooks 25, the front filter holder 14A is locked to the holder case 12. This prevents the front filter holder 14A from moving out.

In so doing, a number of ribs are provided in the outer surfaces of the front filter holder 14A, thereby reducing the looseness between the front filter holder 14A and the holder case 12.

Similarly, the rear filter holder 14B is made to face the other opening of the space portion 16 of the holder case 12 and inserted into the space portion 16 also from the side opposite the flange portion 14e. By doing this, the rear filter holder 14B can be mounted on the other side (for example, rear side) of the holder case 12 in the same way as is done with the front filter holder 14A. At this time, since the nail portions 21a having been pushed beyond the nail hooks 25 are engaged with the end faces of the nail hooks 25, the rear filter holder 14B is locked to the holder case 12. This prevents the rear filter holder 14B from moving out.

In so doing, a number of ribs are provided in the outer surfaces of the rear filter holder 14B, thereby reducing looseness between the rear filter holder 14B and the holder case 12.

To remove the filter holders 14A and 14B from the holder case 12, locking of the filter holders 14A and 14B using the four locking pieces 17 is initially released in the filter holders 14A and 14B. That is, the nail portions 17a of the four locking pieces 17 having been engaged with the nail hooks 25 are released from the nail hooks 25 in the front filter holder 14A. The nail portions 21a of the four locking pieces 21 having been engaged with the nail hooks 25 are also released from the nail hooks 25 in the rear filter holder 14B. Then, the filter holder 14A (or 14B) is pulled out of the space portion 16 by holding the catches 26 provided in the filter holders 14A and 14B. Thus, the filter holders 14A and 14B can easily be separated from the holder case 12.

The air filter unit 10, in which the filter holders 14A and 14B are mounted or from which the filter holders 14A and 14B are removed in such a manner, can be mounted in and removed from the air filter receiving portion 5 of the projector apparatus 1, for example, as follows.

First, as illustrated in FIG. 1, the grid-like cover 6 is removed from the upper casing 3 of the apparatus casing 2, and then the two air filter units 10 are made to face the air filter receiving portion 5. Next, the two air filter units 10 are inserted from the rear filter holder 14B side into the air filter receiving portion 5 and disposed therein side by side. At this time, by inserting each air filter unit 10 until the air channel protrusion portions 22 of the holder case 12 come into contact with the partition wall 19, each air filter unit 10 can automatically be positioned in place inside the air filter receiving portion 5. By doing this, the communicating opening 28 of the holder case 12 is aligned with the air intake 31 of the cooling fan 30 that is secured to the lower casing 4. Then, by fitting the grid-like cover 6 on the air intake 9 of the air filter receiving portion 5, assembly of the air filter units 10 is complete.

In contrast, each air filter unit 10 can easily be removed from the projector apparatus 1 by reversing the above-described assembly. First, the grid-like cover 6 is removed from the air intake 9 of the air filter receiving portion 5. Then, the two catches 18 provided in the holder case 12 are held by both hands to pull out the air filter unit 10 outward in the horizontal direction. By doing this, the air filter unit 10 can easily be removed from the air filter receiving portion 5. In addition, replacement of the air filters can quite easily and quite rapidly be performed because the air filters can be replaced by simply removing and inserting the holder case (cartridge), which contains a plurality of air filters, from and into the air filter receiving portion 5.

In the projector apparatus 1 according to an embodiment of the present invention having such a structure as described above, a pressure on the air filter unit 10 side facing the air intake 31 is reduced to a negative one by a drawing force of the cooling fan 30 when the cooling fan 30 is driven. The negative pressure generated by driving the cooling fan 30 acts on the air in the entirety of the air filter receiving portion 5 through the space portion 16 of the holder case 12. The negative pressure further acts on the air outside the apparatus casing 2 through the air intake 9. As a result, a portion of air E1 that exists outside the air intake 9 flows into the air filter receiving portion 5 from the air intake 9. The portion of air E1 flows in the first air channel 41 and the remaining portion of the air flows in the second air channel 42. The air having flowed in either channel moves toward the air intake 31 side.

In other words, as illustrated in FIG. 6, the portion of air E1, which flows in the first air channel 41, passes through the front air filter 15A that is secured in a side close to the air intake 9 of the holder case 12 immediately after its inflow from the air intake 9, and reaches the space portion 16. The remaining portion of air E1, which flows in the second air channel 42, moves to the upper portion of the holder case 12 after its inflow from the air intake 9, passes through the channel space 5a formed between the upper surface of the holder case 12 and the upper surface of the air filter receiving portion 5, and moves to the channel space 5b formed on the rear side of the holder case 12. Then, the remaining portion of air E1, which flows in the second air channel 42, passes through the rear air filter 15B, which is secured on a side away from the air intake 9 of the holder case 12, from the rear side to the front side and also reaches the space portion 16.

Air E2 having passed through the front and rear air filters 15A and 15B and having been dust-filtered is supplied to the cooling fan 30 from the space portion 16 through the communicating opening 28 and the air intake 31 to be delivered inside the apparatus casing 2. This enables the projector apparatus 1 to deliver a great amount of dust-filtered air E2 into the apparatus casing 2 in order to efficiently cool the light source unit, the optical unit, and so forth.

As described above, the present embodiment has a structure in which the two air filters, the front and rear air filters 15A and 15B, are disposed such that the two air filters, the front and rear air filters 15A and 15B, oppose each other with a predetermined distance provided therebetween so as to face each other, and the two air channels 41 and 42 are provided for these front and rear air filters 15A and 15B to cause the air to be separately passed through the front and rear air filters 15A and 15B. Therefore, the total filtering area can be doubled without increasing the opening area of the air intake 9, and accordingly, the capacity to remove dust from the air can be doubled. By doing this, the front and rear air filters 15A and 15B can have an extended time between the occurrences of clogging therein. This can reduce the frequency of replacing the air filters and, accordingly, facilitate the maintenance management. Furthermore, since the degree of dust accumulation decreases, a decrease in air intake capacity can be suppressed. This can in turn suppress temperature rise of electronic components due to insufficient cooling caused by decreased air intake, thereby suppressing degradation of the electronic components.

As described above, the total filtering area can be increased without increasing the number and area of air filters even when the number and area of the air intakes 9 is limited due to a size limitation of the apparatus casing 2. As a result, the air intake capacity can be increased by increasing the capacity to process dust in the air. This allows the components installed inside the apparatus casing 2 to be efficiently cooled within a limited space. In addition, a cartridge (holder case) contains the plurality of the air filters therein. By removing and mounting the cartridge from and in the apparatus casing 2, the air filters can be replaced in a simple operation. This can simplify replacement of the air filters and facilitate the maintenance.

Furthermore, by providing induction areas (channel space 5a and channel space 5b) inside the apparatus casing 2, the air filters can also be arranged in such areas that are not immediately inside the air intake. This allows the total filtering area to be increased in the limited arrangement space compared to related-art projector apparatuses. Although the induction area (channel space 5a) is provided above the air filter unit 10 contained in the air filter receiving portion 5 in the present embodiment, the induction area (channel space) may be provided at a side of the air filter unit 10.

Despite the above description, the embodiment according to the present invention is not limited to the above-described embodiment. Various modifications may be allowed without departing from the gist of the embodiment according to the present invention. For example, the same air filter is used for the front air filter 15A and the rear air filter 15B in the above-described embodiment. However, it is clear that the filters may be different from each other in terms of shape, size, material, and so forth. In addition, two air filters are used in the above-described embodiment. However, a structure using three or more air filters may instead be allowed. For example, in a case where three air filters are used, the three filters are disposed so as to face each other with a predetermined distance therebetween, and an induction area is divided into two so as to provide second and third air channels. In such a case, the three air channels are made to meet on a downstream side. The projector apparatus having such a structure can also increase the capacity to remove dust from the air and increase the air intake capacity.

What is claimed is:

1. A projector apparatus that projects an image to a projected surface by illuminating an image forming element using light from a light source, the projector apparatus comprising:
    an apparatus casing that contains the light source and the image forming element;
    an air filter receiving portion that is provided in the apparatus casing and includes an air intake through which air is drawn;
    a plurality of air filters that have substantially the same area as an opening area of the air intake and are disposed opposite each other so as to face each other in the air filter receiving portion;
    a cooling fan that causes air to flow into the projector apparatus through the air intake by drawing air therearound and causes the air to pass through the plurality of air filters before blowing the air onto the light source and the image forming element to dissipate heat therefrom;
    a first air channel that directs a portion of the air flowing into the projector apparatus through the air intake to a front air filter that is positioned close to the air intake among the plurality of air filters and directs the air to the cooling fan by causing the air to pass through the front air filter; and
    a second air channel that directs the remaining portion of the air to a rear air filter that is positioned away from the air intake and directs the air to the cooling fan by causing the air to pass through the rear air filter.

2. The projector apparatus according to claim 1, further comprising:
    a holder case having openings able to receive the plurality of air filters,
    wherein the holder case which has received the plurality of air filters in the openings is removably mounted in the air filter receiving portion.

3. The projector apparatus according to claim 2, further comprising:
    a plurality of filter holders in which the air filters are mounted,
    wherein the plurality of air filters are removably held in the holder case by mounting the plurality of filter holders in the openings.

4. The projector apparatus according to claim 2,
    wherein the holder case is provided with a communicating opening that communicates with an air drawing side of the cooling fan, and
    wherein the second air channel is provided outside an opposing surface of the holder case, the opposing surface being opposite to the surface where the communicating opening is provided in the holder case that is received in the air filter receiving portion, or provided outside a surface that perpendicularly intersects with the opposing surface.

5. The projector apparatus according to claim 3,
    wherein the holder case includes
    locking pieces having an elastic property and used to secure the filter holders.

6. The projector apparatus according to claim 2,
    wherein the holder case includes
    a catch for inserting and removing the holder case into and from the air filter receiving portion, and
    a positioning protrusion portion for positioning the holder case in place in the air filter receiving portion when the holder case is inserted into the air filter receiving portion.

* * * * *